United States Patent [19]
Stauffer et al.

[11] Patent Number: 5,582,386
[45] Date of Patent: Dec. 10, 1996

[54] ADJUSTABLE SUPPORT ARRANGEMENT

[75] Inventors: Sven Stauffer, Tyresö ; Kjell Ekeblom, Huddinge, both of Sweden

[73] Assignee: Telefonaktiebolaget LM Ericsson, Stockholm, Sweden

[21] Appl. No.: 336,111

[22] Filed: Nov. 4, 1994

[30] Foreign Application Priority Data

Nov. 29, 1993 [SE] Sweden ................... 9303960

[51] Int. Cl.$^6$ .................................................. F16M 13/00
[52] U.S. Cl. .......................................... 248/664; 248/396
[58] Field of Search ................................... 248/396, 668, 248/664, 688, 398, 220.21, 188.2, 222.51, 346.06, 185.1, 188.2, 678

[56] References Cited

U.S. PATENT DOCUMENTS

| | | | |
|---|---|---|---|
| 2,297,556 | 9/1942 | Hermann | 248/346.06 |
| 2,540,296 | 2/1951 | Schwend et al. | 248/664 |
| 3,784,135 | 1/1974 | Owen, Jr. | 248/664 |
| 4,568,801 | 2/1986 | Gates et al. | |
| 4,776,553 | 10/1988 | Kobayashi | 248/346.06 X |
| 4,819,266 | 4/1989 | Awakowicz et al. | |
| 5,069,407 | 12/1991 | Williams | 248/222.51 X |
| 5,087,004 | 2/1992 | Lundell et al. | 248/346 X |
| 5,121,427 | 6/1992 | Gumb et al. | |

FOREIGN PATENT DOCUMENTS 2191394  12/1987  United Kingdom .

*Primary Examiner*—Karen J. Chotkowski
*Attorney, Agent, or Firm*—Burns, Doane, Swecker & Mathis, LLP

[57] ABSTRACT

An adjustable support for an apparatus allows the apparatus to be positioned at a selected inclination relative to a supporting surface, for example, a telephone supported on a table surface. The support includes at least one apparatus foot, wherein one end of the apparatus rests on a supporting surface and the other end of the apparatus rests on the foot. The bottom of the apparatus includes a hinge in which one end of the foot is fastened for rotatable movement. The bottom of the apparatus is provided with at least one stop ledge which is spaced from the hinge, and the apparatus foot is provided with a stop cleat which in a first position abuts the stop ledge. The stop cleat is provided with a lever which, when pressed, causes the stop cleat to move resiliently to one side to pass the stop ledge, allowing the apparatus foot to be moved to a second position relative to the apparatus bottom.

4 Claims, 3 Drawing Sheets

5,582,386

ADJUSTABLE SUPPORT ARRANGEMENT

BACKGROUND

The present invention relates to an adjustable support arrangement by means of which an apparatus can be brought to different angles of inclination in relation to a supportive surface, for instance a telephone apparatus on a table top. The arrangement includes at least one apparatus foot, wherein one end of the apparatus supports against the supportive surface and the other end supports against the apparatus foot. The bottom of the apparatus is provided with a hinge means into which one end of the apparatus foot can be rotatably inserted with a snap-in action.

In order to obtain good ergonomy, for instance to enable a display and designations to be readily discerned by eliminating reflections and shadows, and to enable the keys of a telephone key pad for instance to be manipulated effectively, it is necessary to provide an adjustable foot or base which will enable the body of the apparatus to be brought to different angles of inclination. The foot shall be stable and easy to handle when making the adjustment, and it shall also be easy to fit and to dismantle when using the apparatus alternatively on a table or on a wall, and will also be capable of being produced at a low cost and have an attractive design. The foot must also provide good handling stability to the apparatus assembly.

Examples of known solutions of this problem utilize an additional detail, a U-shaped element or the like, which is placed in different positions on the foot part of the adjustable support. Other solutions to the problem utilize only one single detail, although in this case the bottom of the apparatus rests against the top of the table when in its lower inclined position, for instance a keyboard having an adjustable foot or feet.

These known solutions have the drawback of being expensive and complicated in manufacture and also in their handling, and do not impart good stability to the apparatus.

SUMMARY

The object of the present invention is to avoid the aforesaid drawbacks and to provide an adjustable support arrangement of simple construction which is inexpensive in manufacture, simple to adjust to different angles of inclination and which will impart good stability to the apparatus in all positions.

This object is achieved with a construction which is comprised of an element, an apparatus foot, and functional elements formed in the bottom of the apparatus, such as hinge means, guide means, hooks for defining outer stop positions, stop means for determining different positions of inclination, etc, both of which are injection molded from a plastic material. The construction enables manufacture to be achieved with the aid of a die casting tool. According to a preferred embodiment of the invention, the adjustable support arrangement is adjustable solely between two positions, although it will be understood that the arrangement may be designed to enable the apparatus to be adjusted between more than two positions. More specifically, the invention finds expression in an adjustable support arrangement which has the characteristic features set forth below.

The invention will now be described in more detail with reference to a preferred exemplifying embodiment thereof and also with reference to the accompanying drawings.

DETAILED DESCRIPTION

Figure 1A:
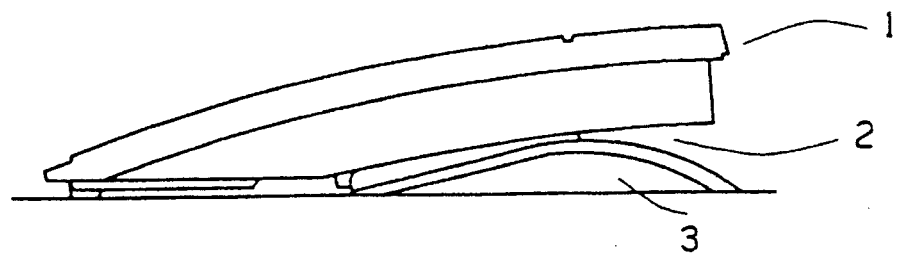
FIGS. 1a and 1b illustrate a telephone apparatus having an adjustable support arrangement according to the invention, with the apparatus shown in two different inclined positions.
Figure 1B:
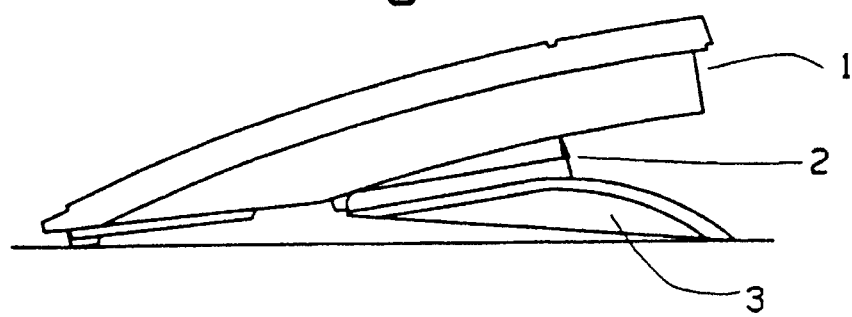

FIG. 1 is a side view of a telephone apparatus 1 which includes an inventive adjustable support arrangement and shows the apparatus resting on a supportive surface. The adjustable support arrangement 2 includes a foot 3. The apparatus is shown in FIG. 1a in its lowermost position, with the apparatus foot 3 fully inserted and resting against the underside of the apparatus. FIG. 1b shows the telephone apparatus 1 in a raised position in which the foot 3 has been brought to an angle in relation to the underneath of the apparatus, as will be described in more detail below. As shown in the figure, when the apparatus is in this position one end of the apparatus will rest against the supportive surface while the other end of the apparatus will lie against the foot 3.

Figure 2A:
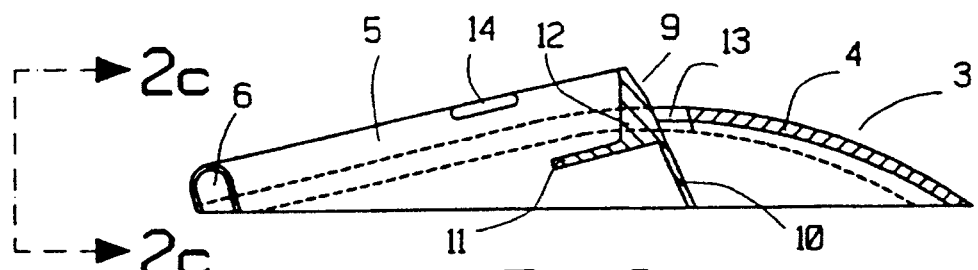
FIGS. 2a, 2b and 2c are respectively a sectional view, a view from above and from one side of an apparatus foot which forms part of the adjustable support arrangement.
Figure 2B:
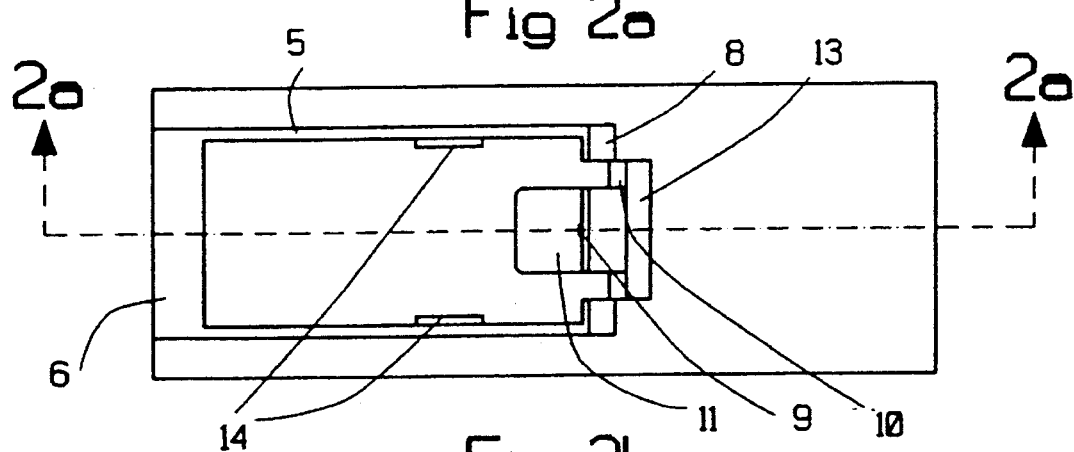
Figure 2C:
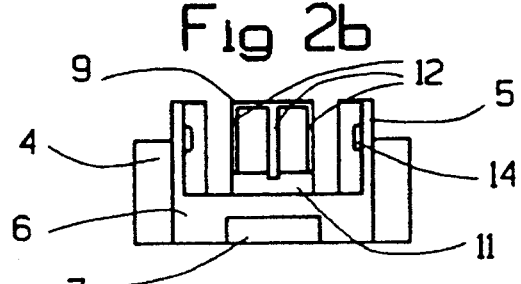

The foot 3 is shown in more detail in FIGS. 2a, 2b and 2c. The foot 3 is preferably in the form of an arcuate or arched plastic profile 4. However, the shape of the foot forms no part of the present invention and the foot may, of course, have a shape other than that mentioned. One end of the foot 3 is provided with a generally rectangular frame 5 which projects up from the foot, which is open inwardly of the frame. That side of the frame 5 which lies proximal to the foot 3 is provided with a rounded hinge pin 6 which includes a recess 7, the purpose of which will be explained below.

The opposite side 8 of the frame 5 is broken and in its place there is provided a centered stop shoulder or cleat 9 which extends parallel with the side 8, upwardly from a supporting and partitioning wall 10 provided in the foot 3. The stop cleat 9 includes a plate-like lever 11 which is joined to the cleat by means of stiffening ribs 12. Since the foot 3 is made of a plastic material, the stop cleat or shoulder 9 can be caused to move resiliently to one side, by pressing-up the lever 11. This resilient movement of the cleat 9 is facilitated by extending the opening 13 slightly beyond the frame 5, as will be seen from FIG. 2b. The sidewalls of the frame 5 have mounted thereon stop cams 14 which limit rotation of the foot 3 in relation to the telephone apparatus 1, as will be explained below.

Figure 3A:
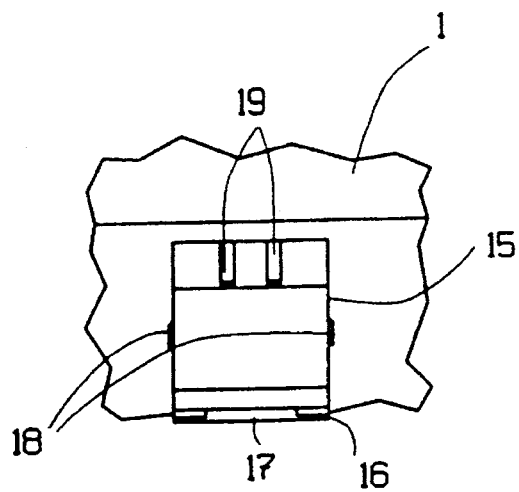
FIG. 3a and 3b illustrate the construction of the apparatus bottom

The remaining members of the adjustable support arrangement 2 are formed in the bottom of the apparatus 1 and can be seen from FIG. 3. The bottom of the apparatus is provided with a downwardly protruding, generally rectangular part 15 which is adapted to the frame 5 on the foot 3. One end of the rectangular part 15 is provided with a recess 16 which functions as a hinge pivot-means and into which the hinge pin 6 of the foot 3 can be snapped. The recess 16 includes a stop hook 17 which projects into the recess 7 in the hinge pin 6 on the foot 3. The foot 3 is fitted into the telephone apparatus, by inserting the foot into the hinge recess 16 in the bottom of the apparatus, where it is locked by rotating the foot through about ninety degrees, wherein the stop hook 17 is inserted into the recess 7 of the pin 6 in the apparatus foot and is held therein. The foot is snapped firmly over the chamfered or bevelled stop cams 18, which are mounted on the outwardly projecting part 15 and coact with the corresponding stop cams 14 in the foot. When removing the foot, the foot is drawn by the stop cams, which are also slightly bevelled on the underside.

Figure 3B:
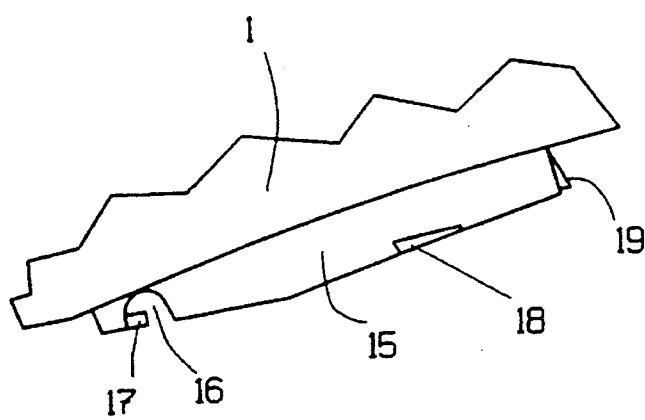
Figure 4A:
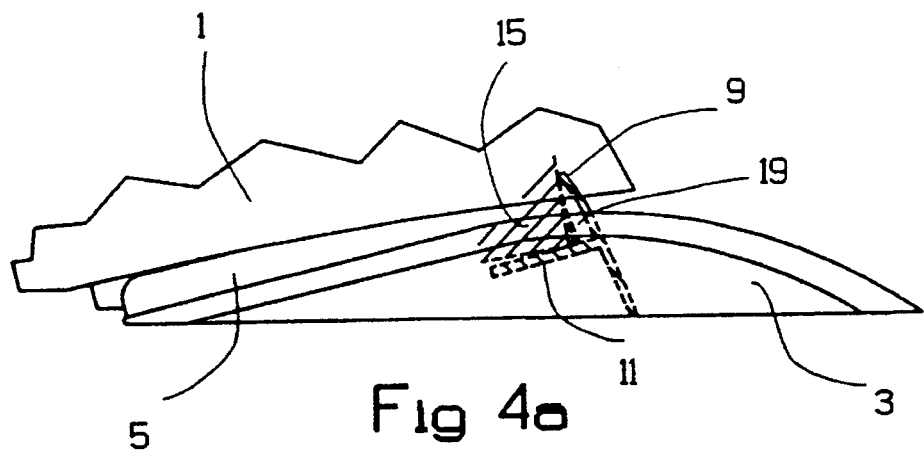
FIGS. 4a and 4b illustrate in more detail the function of the elements forming part of the adjustable support arrangement.
Figure 4B:
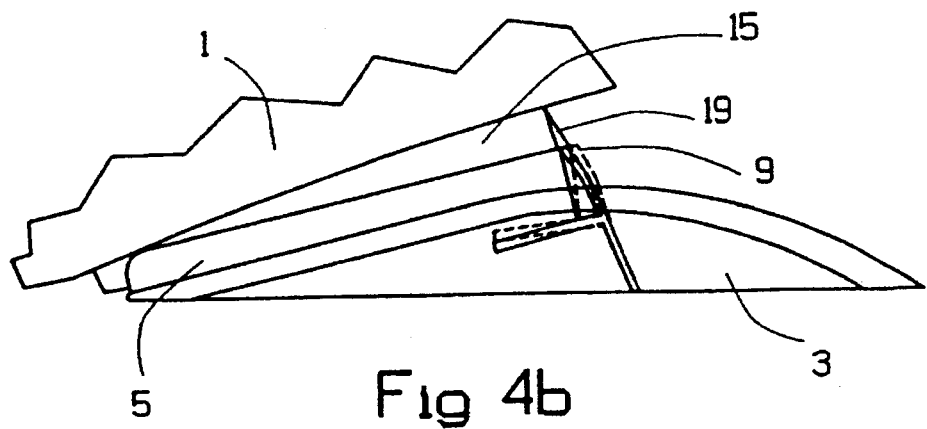

The outwardly projecting part 15 is provided on the side thereof distal to the hinge pin 16 with an outwardly projecting, triangular stop ledge 19, as shown in FIG. 3b. The cleat or shoulder 9 on the apparatus foot 3 rests against the stop ledge 19 when the foot is in its extended state, as shown in FIG. 4b. The angle of inclination of the telephone apparatus is adjusted by exerting pressure on the stop cleat 9 provided with the lever 11 therewith causing the stop shoulder to spring-out, as shown in broken lines in FIG. 4b, so as to pass the stop abutment 19. The foot 3 can now be turned towards the apparatus bottom and stops in the bottom position, which is the lowest inclined position, with the outwardly projecting part 15 resting on the lever 11. In this position, the stop abutment 19 is accommodated in the space between the stop shoulder 9 and the stiffening ribs 12, as shown in FIG. 4a. The support arrangement is adjusted to the right-hand inclined position, by turning the foot back so as to cause the stop cleat 9 to snap-in against the stop ledge 19.

Figure 3C:
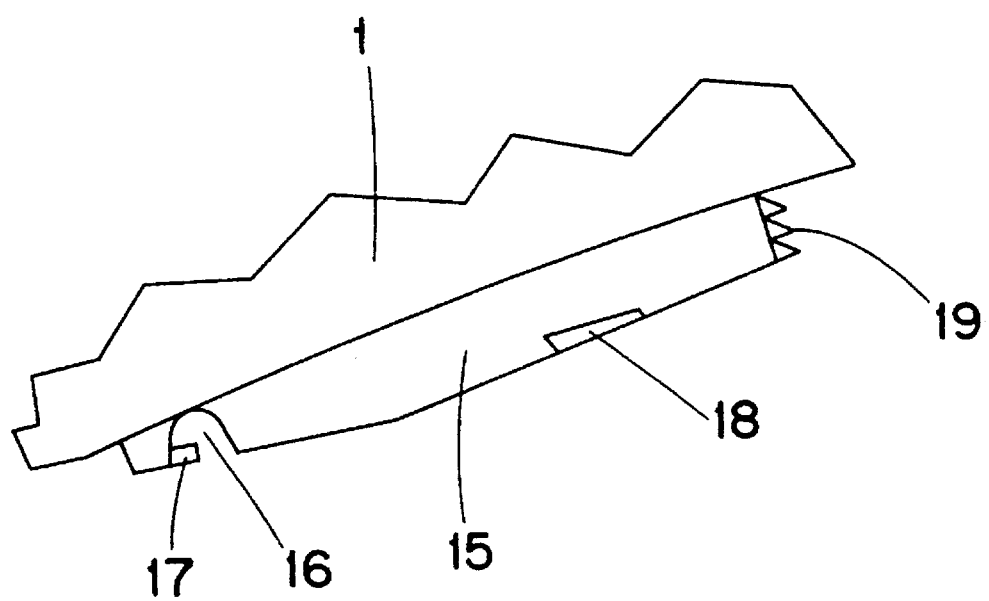
FIG. 3c illustrates an alternative embodiment of the apparatus bottom.

As shown in FIG. 3c, the adjustable support arrangement 2 can be provided with more than two adjustment positions, by providing the support arrangement with three or more stop positions, by providing further stop ledge or like abutments 19 one above the other on the outwardly projecting part 15.

It will be understood that the invention is not restricted to the aforedescribed and illustrated embodiment thereof and that modifications can be made within the scope of the following claims.

What is claimed is:

1. An adjustable support for positioning an apparatus at a selected inclination in relation to a supporting surface, comprising:

a bottom surface of the apparatus;

at least one foot attachable to the bottom, wherein one end of the apparatus bottom rests on a supporting surface and another end of the apparatus bottom is supported by the foot;

hinge pivot means formed on the bottom of the apparatus, one end of the foot being fastenable to the hinge pivot means for relative rotation;

at least one stop ledge having a triangular shape formed on the bottom of the apparatus and spaced from the hinge pivot means; and a stop cleat resiliently formed on the foot and having a lever for moving the stop cleat from a rest position, and stiffening ribs joining the stop cleat and the lever;

wherein the foot has an extended position relative to the bottom of the apparatus in which the stop cleat in the rest position abuts the stop ledge, and a collapsed position in which the stop cleat is moved from the rest position past the stop ledge, and wherein when the foot is in the collapsed position, the stop ledge is accommodated in a space between the stop cleat and the stiffening ribs, and when the apparatus foot is moved to the extended position, the stop ledge functions as a support surface which presses the stop cleat from the rest position so that the foot is able to move to the extended position.

2. An arrangement according to claim 1, wherein the apparatus foot includes a rectangular frame; and the apparatus bottom has an outwardly projecting rectangular part on which the stop ledge is disposed; and the part and the frame cooperate to guide rotation of the foot in relation to the apparatus.

3. An arrangement according to claim 2, wherein the frame and the outwardly projecting part are provided with mutually coacting stop cams which restrict rotation of the foot away from the apparatus.

4. An arrangement according to claim 2, wherein a plurality of stop ledges are disposed one above the other on the outwardly projecting part; and the foot has a plurality of extended positions corresponding to the plurality of stop ledges.

\* \* \* \* \*